Figure 1:
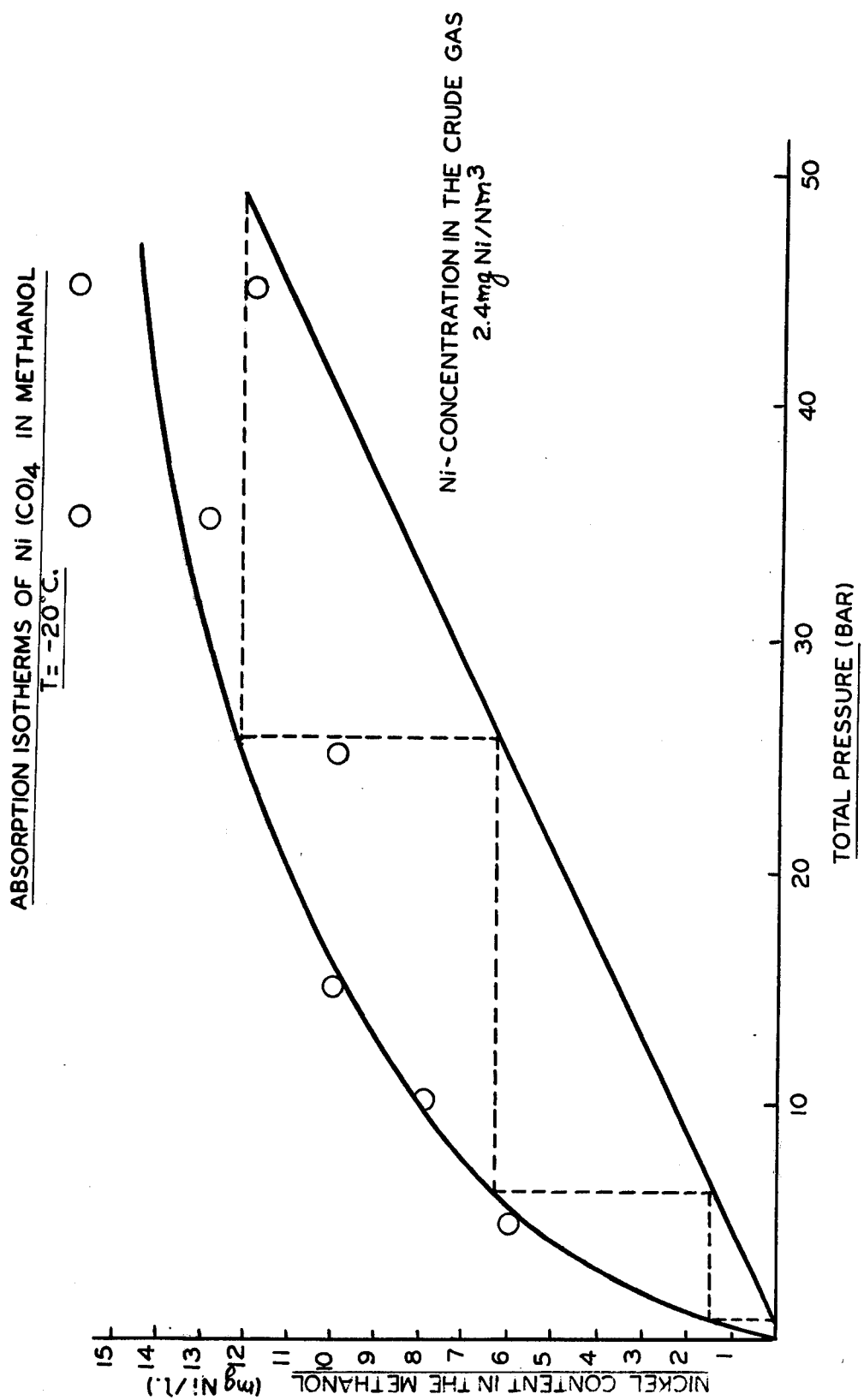

United States Patent [19]

Bohmholdt et al.

[11] 4,142,875
[45] Mar. 6, 1979

[54] PROCESS FOR THE PURIFICATION OF SCRUBBING SOLVENTS BY REMOVAL OF NI(CO)$_4$

[75] Inventors: Gerd Bohmholdt, Marl-Polsum; Günter Deininger, Wulfen; Hans-Otto Gerlach; Winfried Hahn, both of Gelsenkirchen-Buer; Wilhelm Hüwels, Essen, all of Fed. Rep. of Germany

[73] Assignee: Veba-Chemie Aktiengesellschaft, Gelsenkirchen-Buer, Fed. Rep. of Germany

[21] Appl. No.: 776,322

[22] Filed: Mar. 10, 1977

[30] Foreign Application Priority Data

Mar. 16, 1976 [DE] Fed. Rep. of Germany ....... 2610982

[51] Int. Cl.$^2$ ............................................ B01D 19/00
[52] U.S. Cl. ........................................ 55/72; 423/210; 423/417; 423/561 R
[58] Field of Search ..................................... 55/46–51, 55/68, 70, 71, 72, 73; 75/82; 423/417, 210, 561 R

[56] References Cited

U.S. PATENT DOCUMENTS

| 3,086,340 | 4/1963 | Schmeckenberger | 55/68 |
| 3,688,474 | 9/1972 | Head et al. | 55/72 |
| 3,725,534 | 4/1973 | Reisch | 423/417 |
| 3,880,615 | 4/1975 | Grunewold | 55/68 |

*Primary Examiner*—Bernard Nozick
*Attorney, Agent, or Firm*—Sprung, Felfe, Horn, Lynch & Kramer

[57] ABSTRACT

A process for the purification of pressurized gases, such as those emanating from the partial gasification resp. combustion of fuel, which gases contain Ni(CO)$_4$, which comprises contacting said Ni(O)$_4$ containing gas with a solvent at a temperature of from −60 to 0° C., thereby forming a solution containing the gases and dissolved Ni(CO)$_4$, and thereafter heating said solution at a temperature of from 70 to 250° C. for at least 0.25 hour at a pressure higher than the vapor pressure of said solvent, thereby precipitating and thereafter recovering nickel compound and releasing a purified solvent.

10 Claims, 2 Drawing Figures

4,142,875

PROCESS FOR THE PURIFICATION OF SCRUBBING SOLVENTS BY REMOVAL OF NI(CO)₄

BACKGROUND OF THE INVENTION

1. Field of the Invention

This invention relates to purification of gases. More particularly this invention relates to the purification of gases such as those gases emanating from the partial gasification resp. combustion of a fuel, which gases contain heavy metal compounds, by a two-stage process in which the gases are first scrubbed with a solvent to thereby form a solution of the gases and heavy metal compounds, and thereafter the resultant solution is heated at from 70° to 250° C. for at least 0.25 hour at a pressure higher than the vapor pressure of the solvent while the heavy metals are precipitated.

2. Discussion of the Prior Art

The invention relates to a process in which the deposition and caking of insoluble heavy metal compounds in the degasification column (also known as a regeneration unit) of a gas scrubber is prevented. An example of such a gas scrubber is one known as a Rectisol plant which is used with gases emanating from the partial gasification resp. combustion of fuels containing heavy metals.

Gas scrubbers of this kind are components of plants producing synthesis gas by the partial gasification resp. combustion of oils, oil residues, coal, or lignite, for example petroleum residue plants and plants for the destructive distillation of coal, and they serve to remove gaseous impurities, such as $H_2S$, HCN, COS and HSCN which hinder further catalytic processing of the resulting gases. In addition, these scrubbers also absorb those gaseous impurities such as metal carbonyls which, together with the first mentioned gaseous impurities can form insoluble compounds which form deposits in the gas scrubbers, particularly in the regeneration units thereof. The deposition and caking of these insoluble compounds in the degasification columns of the gas scrubbers can seriously reduce the operating life of the scrubber.

When solid and liquid fuels of the above types containing heavy metals, such as Visbreaker residues, are subjected to partial gasification resp. combustion and thereafter to scrubbing, and also when increased total pressures are used in these gasification plants, problems of this kind occur on an increased scale.

The present tendency is to use petroleum residues containing high proportions of heavy metals and to process them at higher total pressures. Hitherto no economical solutions have been known for preventing such caking and therefore achieving a normal operating life.

It is an object of this invention, therefore, to prevent the deposition of insoluble heavy metal compounds in the degasification columns of gas scrubbers, thereby lengthening the operating life of such scrubbers.

SUMMARY OF THE INVENTION

In accordance with this invention there is provided a method for a gas purification process in which the deposition of heavy metal compounds in the degasification column of the gas scrubbing process is avoided. According to the present invention, the pressurized gases are purified by contacting the same initially with a solvent at a temperature of −60° to 0° C. to form a solution containing said gases and said heavy metal compounds, and thereafter precipitating said heavy metals by heating the resultant solution at a temperature from 70° to 250° C. at a pressure higher than the vapor pressure of the solvent for a period of time of at least 0.25 hour.

The present invention is conducted using a single or multi-stage low temperature gas scrubbing operation wherein initially the gases to be purified are contacted at −60° to 0° C. using a solvent to form a solution containing the gases and dissolved heavy metal compounds. This step is followed in known manner by degasification of the solvent by pressure reduction, evacuation, and heating. The process according to the invention is formed so that before the solution containing the gases and the heavy metal compounds enters the degasification column, the heavy metal compounds in the solution are precipitated in a preliminary reactor, which can optionally be filled with packing material, by heating the solution (scrubbing liquid), or a portion thereof, at a temperature of from 70° to 250° C., preferably 80° to 180° C., at a pressure higher than the vapor pressure of the solvent (scrubbing liquid) for a period of time of at least 0.25 hour, preferably from 0.5 to 2.0 hours.

In accordance with the preferred embodiment of the present invention, precipitation of the heavy metals is augmented by introducing an acid gas during the heating of the solution at 70° to 250° C. Suitable acid gases include hydrogen sulfide. Preferably, the hydrogen sulfide is introduced into the preliminary reactor wherein heating is taking place simultaneously with such heating.

Large amounts of hydrogen sulfide can be employed for this purpose. The upper limit of the amount of hydrogen sulfide introduced is dictated only by the maximum possible gas filling of the volume of the preliminary reactor.

While a wide variety of solvents are useful as scrubbing liquids in accordance with the present invention, of these particularly contemplated are the polar organic solvents especially the lower alcohols, e.g., $C_1$–$C_8$, especially $C_1$–$C_4$ alcohols, and in particular methanol. Lower ketones are also contemplated, especially those having an alkyl group of $C_1$–$C_4$ carbon atoms on either side of the carbonyl carbon atom. A particularly contemplated ketone is acetone. Amines and amides are also useful especially primary, secondary and tertiary amines and amides where the organic moiety is an alkyl group of $C_1$–$C_4$ carbon atoms. Also contemplated are heterocyclic amines and amides. Particularly contemplated compounds include N-methylpyrrolidone and dimethylformamide.

The solvents (scrubbing agents) for the low temperature scrubbing operation are required to have high selectivity while a prerequisite is high solubility. At the same time, a low melting point, low viscosity and chemical stability in relation to the absorbed gases is also necessary. Furthermore, it is desired that the solvent have a low price if any solvent losses are to be encountered.

The upper limit of the amount of hydrogen sulphide introduced is dictated only by the maximum possible gas filling of the volume of the preliminary reactor.

Polar organic compounds, such as low alcohols, for example methanol, low ketones, for example acetone, and also amines and amides, for example N-methylpyrrolidone and dimethylformamide, are particularly suitable as solvents for the application of the process of the present invention. The scrubbing agents for the low temperature gas scrubbing are required to have high selectivity, while a prerequisite is high solubility. At the same time a low melting point, low viscosity, and chemical stability in relation to the absorbed gases are also necessary. Furthermore, a low price of the solvent will keep costs low if there should be losses of solvent.

The preliminary reactor may be a tank, a tube, or a column. When the preliminary reactor used contains no packing, either the scrubbing liquid may then be fed to a sedimentation vessel or the precipitated heavy metal sulfides may be removed by filtration. The scrubbing liquid freed of heavy metal sulphides in this manner can then be freed of the absorbed gases by known methods and returned to the low temperature gas scrubbing stage. When preliminary reactors containing packing are used the greater part of the sulphides is deposited on the packing.

Any shaped or unshaped material which is inert to the scrubbing liquid, such as packings of porcelain, alumina, silicates, and similar materials, are suitable as packing for the preliminary reactor.

The process of the present invention is illustrated by the following examples:

EXAMPLE 1

A crude gase from a Shell heavy oil gasification plant, having the composition: about 45 volume % of $H_2$
49 volume % of CO
4 volume % of $CO_2$
0.5 volume % of $CH_4$
0.1 volume % of $N_2$
0.7 volume % of $H_2S$
0.03 volume % of COS and
0.1 volume % of $Ar_3$
together with 100 mg $HCN/Nm^3$, and in particular having a content of Ni $(CO)_4$ of $0.94 \times 10^{-6}$ parts by volume, was brought into equilibrium with methanol, which had a water content of 3 volume % at a temperature of $-20°$ C. and at a pressure of from 5 to 48 bars. The distribution isotherms shown in FIG. 1 were found.

Methanolic solutions of this kind with $Ni(CO)_4$ contents of 30 mg/l were passed through a reaction tube which had a length of 2 meters and was filled with ceramic packing. The temperatures were from 80° C. to 140° C., and the residence times from 1/12th hour to 1 hour.

Figure 2:
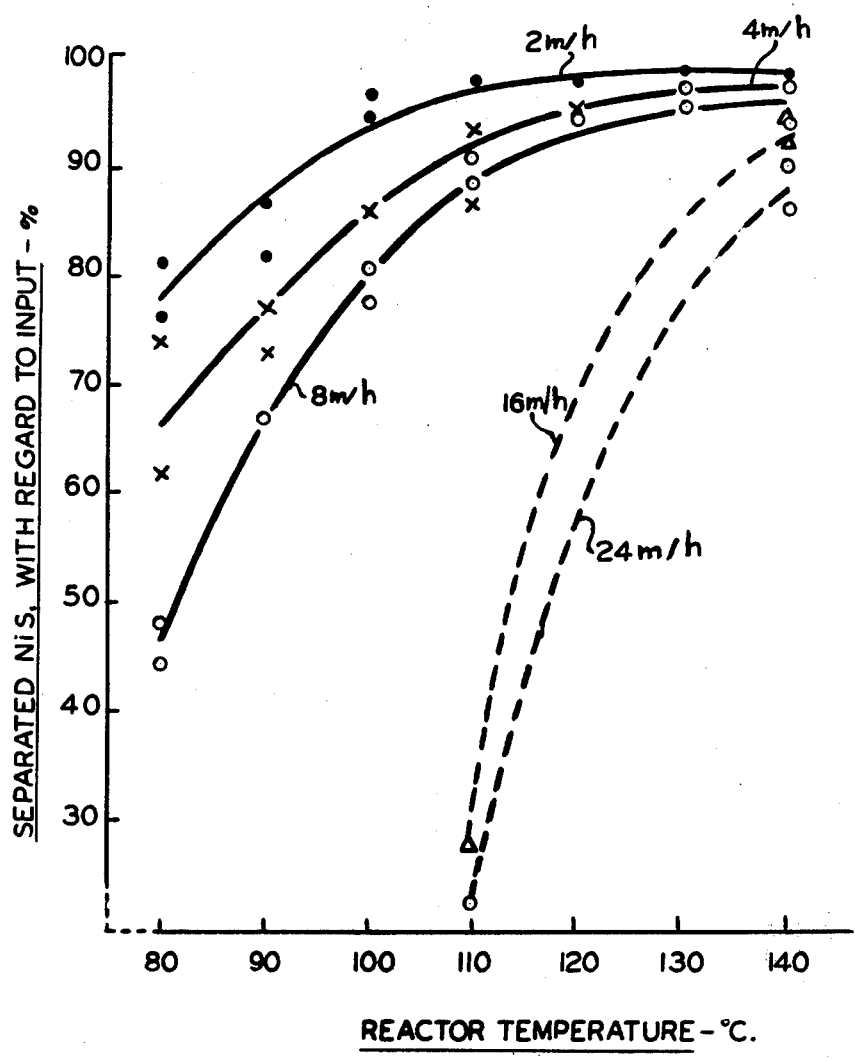

After this treatment the Ni content of the solutions was determined. FIG. 2 shows the proportion of separation of the precipitated nickel compounds plotted against temperature and residence time.

A deep black, adhering coating of nickel sulphide had been deposited on the packing.

Analyses of the deposited solids showed the following main components:

Ni: about 58 weight %
S: (as sulphide) about 32 weight %

EXAMPLE 2

A solution as used in Example 1 was treated in the same manner as in Example 1, but using a reaction tube containing no packing. The temperature in the reaction tube was 130° C., the residence time 0.5 hour. In the outgoing solution all nickel-containing compounds were coagulated and could be easily separated either by filtration or by sedimentation.

What is claimed is:

1. A process for the purification of pressurized gases containing $Ni(CO)_4$ which comprises contacting said $Ni(CO)_4$ containing gases with a solvent at a temperature from $-60°$ to $0°$ C. and thereafter precipitating nickel from the solution by heating the resultant solution at a temperature of from 70° to 250° C. for at least 0.25 hour at a pressure higher than the vapor pressure of the scrubbing liquid and removing the precipitate.

2. A process according to claim 1 wherein the solvent is heated for from 0.5 to 2.0 hours.

3. A process according to claim 1 wherein the solution is heated at from 70° to 250° C. whereby the nickel is precipitated in a preliminary reactor.

4. A process according to claim 3 wherein the preliminary reactor is filled with packing.

5. A process according to claim 3 wherein the solvent is heated at 80° to 180° C.

6. A process according to claim 1 wherein an acid gas is added to the solvent as it is heated at a temperature of from 70° to 250° C.

7. A process according to claim 6 wherein the acid gas is hydrogen sulfide.

8. A process according to claim 1 wherein the solvent is a lower alcohol, lower ketone, amine or amide.

9. A process according to claim 8 wherein the solvent is selected from the group consisting of methanol, acetone, N-methylpyrrolidone and dimethylformaiide.

10. A process for the purification of pressurized gases containing $Ni(CO)_4$ which consists essentially of contacting said $Ni(CO)_4$ containing gases with a solvent at a temperature from $-60°$ to $0°$ C. and thereafter precipitating nickels from the solution by heating the resultant solution at a temperature of from 70° to 250° C. for at least 0.25 hour at a pressure higher than the vapor pressure of the scrubbing liquid and removing the precipitate.